United States Patent
Holmes et al.

(10) Patent No.: US 6,765,487 B1
(45) Date of Patent: Jul. 20, 2004

(54) UNDERWATER DETECTION AND DETERRENT SYSTEM

(75) Inventors: John J. Holmes, Columbia, MD (US); John F. Scarzello, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 16 days.

(21) Appl. No.: 10/271,711

(22) Filed: Oct. 17, 2002

(51) Int. Cl.[7] .................................................. G08B 13/00

(52) U.S. Cl. ..................... 340/541; 340/541; 340/852

(58) Field of Search ............................... 340/541, 984, 340/571, 572.1, 568.1, 565, 852; 180/287; 367/139; 43/9.6

(56) References Cited

U.S. PATENT DOCUMENTS

| | | | | |
|---|---|---|---|---|
| 5,602,799 A | * | 2/1997 | Hecker et al. | 367/139 |
| 5,610,876 A | * | 3/1997 | Jeffers | 367/139 |
| 5,797,210 A | * | 8/1998 | Verburg | 43/9.6 |
| 2002/0186149 A1 | * | 12/2002 | Knaak | 340/984 |

* cited by examiner

*Primary Examiner*—Jeffery Hofsass
*Assistant Examiner*—Eric Blount
(74) *Attorney, Agent, or Firm*—Steven W. Crabb

(57) ABSTRACT

A method and apparatus for detecting and deterring underwater threats is provided that uses numerous anodes and sensors around a ship or other waterborne structure to monitor for intruders and issue electrical shocks to the intruders in increasing amounts to deter sabotage. The underwater detection and deterrent system would provide an alarm and the approximate location of the intruder when the electrical field changes in response to the intruder. The system is capable of providing a lethal electrical shock to the intruder if necessary.

20 Claims, 4 Drawing Sheets

UNDERWATER DETECTION AND DETERRENT SYSTEM

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

Ships throughout the world must operate in a wide variety of sometimes hostile areas to conduct their mission. Of particular concern is the possibility of terrorist threats such as underwater swimmers or autonomous vehicles that may be used to plant explosives or otherwise sabotage ships.

Military ships presently deter this threat while moored or dockside by detonating small explosive charges beneath the ship. This procedure is hazardous to the ship's crew, disrupts onboard routines and requires the handling and storage of additional explosives. Additionally, the environmental impact of such explosions is undesirable and often may be unacceptable to the host port or country. Passive listening detection methods are generally unsuitable in harbors because of the extensive acoustical noise present.

Commercial ships are even more vulnerable from such threats as they generally do not have the expertise or ability to conduct explosive deterrents and do not have the sophisticated sonar systems that would be required to attempt passive detection if it were feasible. Also, it would be economically unfeasible for commercial ships to invest large sums of money in such protection measures.

What is needed is a system that could provide all surface ships, military and commercial, and submarines with a detection and self-defense capability against underwater swimmer threats.

SUMMARY OF THE INVENTION

In accordance with the invention there is provided a new and improved underwater detection and deterrent system that includes numerous anodes that distribute current in the water surrounding an object that is to be protected. Additionally, there are numerous electrical field sensors for sensing the current flow in the water that is emanating from the anodes. A power supply supplies a range of current to the anodes depending on the inputs from a controller. The controller receives current signals from the sensors and generates various control signals for setting the level of current supplied by the power supply to the anodes and for causing some form of alarm to be displayed or sounded.

In a preferred arrangement, the underwater detection and deterrent system uses anodes that are located on and insulated from the hull of a ship. Optionally, the sensors may also be located on the hull of a ship. The controller for the system may be either implemented in hardware or it may preferably incorporate a microprocessor system that runs software. In a preferred arrangement, the underwater detection and deterrent system's current level supplied to the anodes may be manually selected. Optionally, the underwater detection and deterrent system may include an alarm display that has both audible and visual indicators for indicating intrusion and location of the intrusion.

In accordance with a preferred arrangement of the invention, the underwater detection and deterrent system includes a net of anodes and sensors suspended in the water by floats. Optionally, this arrangement may be controlled by a microprocessor. In a preferred arrangement, the current level supplied by the power supply to the anodes may be manually selected. The underwater detection and deterrent system includes an alarm display, preferably located on shore, with both audible and visual indicators for indicating intrusion and location of the intrusion.

In accordance with the invention there is provided a new and improved underwater detection and deterrent system that includes a plurality of anodes distributed on the hull of a ship for imparting a current into an electrolyte, for example seawater, and a plurality of sensors distributed on the hull of the ship for sensing the current flow in the electrolyte. The system includes a power supply for supplying electrical power to the anodes and a controller for receiving and processing current signals from the sensors. The controller outputting a level signal for setting the power supplied by the power supply, and also outputting alarm signals. The alarm signals are received by an alarm display system.

In a preferred arrangement the underwater detection and deterrent system has a microprocessor controller. Optionally, the system may include manual selection for the current level supplied to the anodes. Additionally, the underwater detection and deterrent systems alarm display includes both audible and visual indicators for indicating intrusion as well as the location of the intrusion.

In accordance with the invention there is provided a new and improved method for detecting and deterring underwater swimmer threats to a ship. Power is supplied to a plurality of anodes whereby current flows between the anodes at a predetermined level while the current flow is monitored and an alarm is triggered if the current flow changes. The current flow to the anodes is then increased and pulsed in response to the alarm. The current flow may be reset to the predetermined level if the threat goes away. Optionally, the current flow may be substantially increased by manually selecting a lethal level.

For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENT

Figure 1:
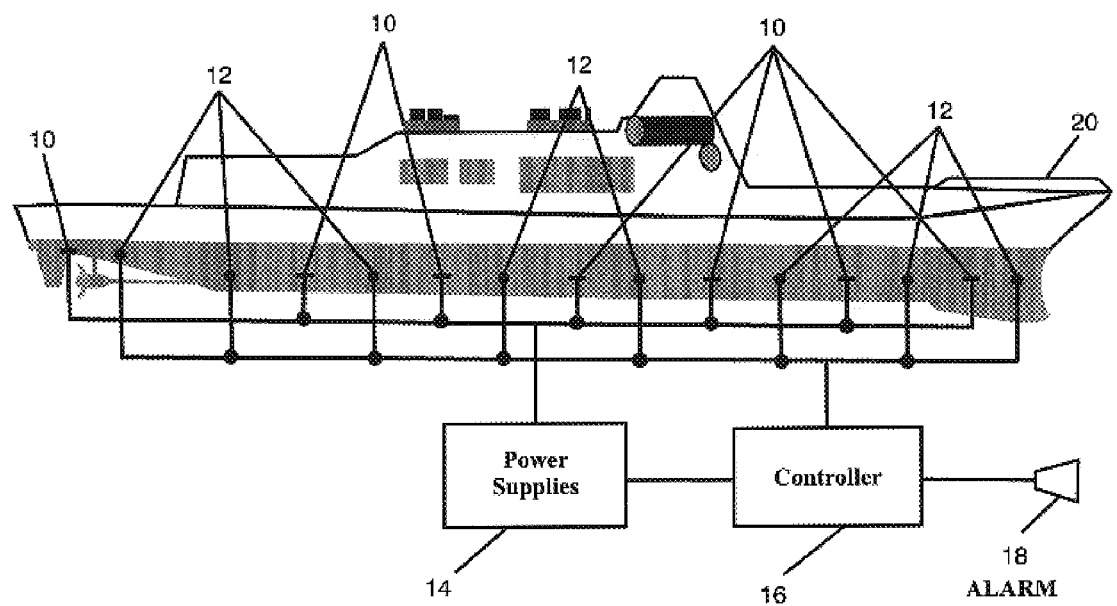
FIG. 1 is a side view of a detection and deterrent system representing one embodiment of the present invention.

Referring now to the example of FIG. 1, the underwater detection and deterrent system is deployed on the hull 20 of a ship. The main components of an embodiment are a power supply 14 that drives a plurality of anodes 10 under control of a controller 16 and sends alarm signals to a display 18 when an intruder is detected by a plurality of sensors 12. The anodes and sensors 12 are dispersed on the hull 20 of the ship below the waterline. The power supply 14, controller 16 and the alarm display 18 are located within the ship at convenient locations.

In the example of FIG. 1, the anodes 10 and sensors 12 are the same type of components presently used for the impressed current cathodic protection corrosion protection system of ships. Virtually every oceangoing vessel today uses an impressed current cathodic protection (ICCP) system to prevent corrosion. Typically, the ICCP systems contain only a few anodes 10 and reference cells or sensors 12 distributed on the hull 20 of a ship. The anodes 10 are insulated from the hull 20 and are powered by a small DC power supply to impart an electric current into the surrounding seawater, which serves as an electrolyte. The current returns to the power supply via the hull 20 and the propellers and shafts. The reference cells or sensors 12 are used to monitor the voltage difference between the hull 20 and a point in the water a few inches away from the hull 20. A controller adjusts the amplitude of the voltage and current to provide approximately 800 mV to 850 mV relative to the hull 20. This prevents the hull 20 and propellers from corroding.

In an embodiment of the present invention the impressed current cathodic protection (ICCP) system is modified to provide a new capability for detecting and deterring underwater threats. The detection and deterrent system of the present invention requires a greater distribution of anodes 10 and sensors 12 than would an ICCP system. For example, on a destroyer class size ship approximately forty anodes 10 and sensors 12 would be needed in order to provide enhanced resolution. The anodes 10 may, for example, be platinum coated wire approximately 2 meters long and insulated from the hull 20 by plastic tubing or similar insulators. Sensors 12, such as silver/silver chloride electric field sensors are also insulated from the hull 20 by plastic or other suitable insulator.

The power supply 14 would supply DC power to the anodes 10 when the system is operating as an ICCP system, but would provide the anodes 10 either switched DC or AC power when the power supply 14 is driving the detection and deterrent system. Preferably, the user selects whether the system is operating as an ICCP system or in a detection and deterrent system. Alternatively, the system could automatically enter detection mode when the ship was stationary and ICCP mode when the ship was under way with manual overrides available for each setting.

Figure 2:
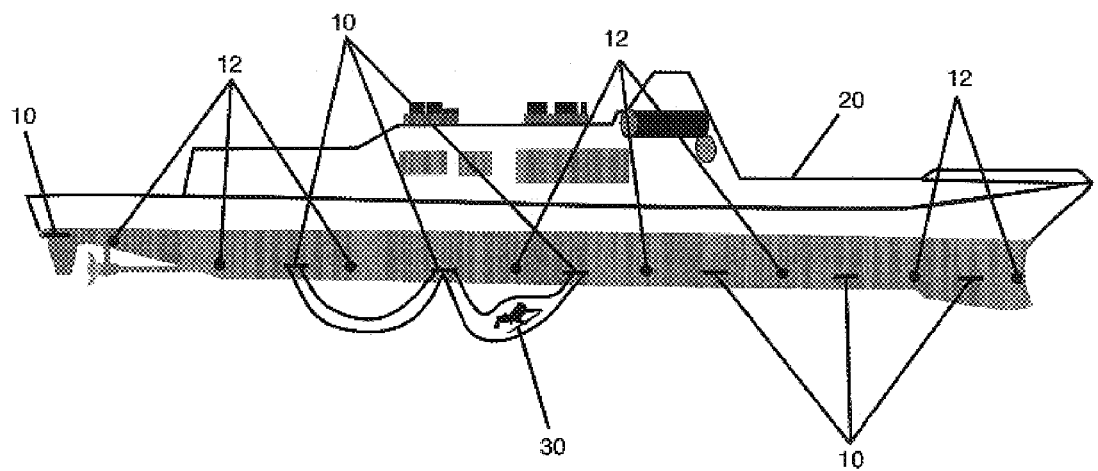
FIG. 2 is a side view of illustrating the interaction between a target and an embodiment of the system.

When the system is in the detection mode, the power supply 14 supplies a low power, low frequency current into the water through the distributed anodes 10. For example, currents of 100 A in the zero to 3 kHz frequency band are pumped into the water when the system is in detection mode. The electric field sensors 12 measure the electric field distributed around the hull 20. As illustrated in FIG. 2, when a swimmer 30 or other sizable underwater target approaches the hull 20 the flow of the electric current is disturbed, which is then detected by the sensors 12.

Figure 3:
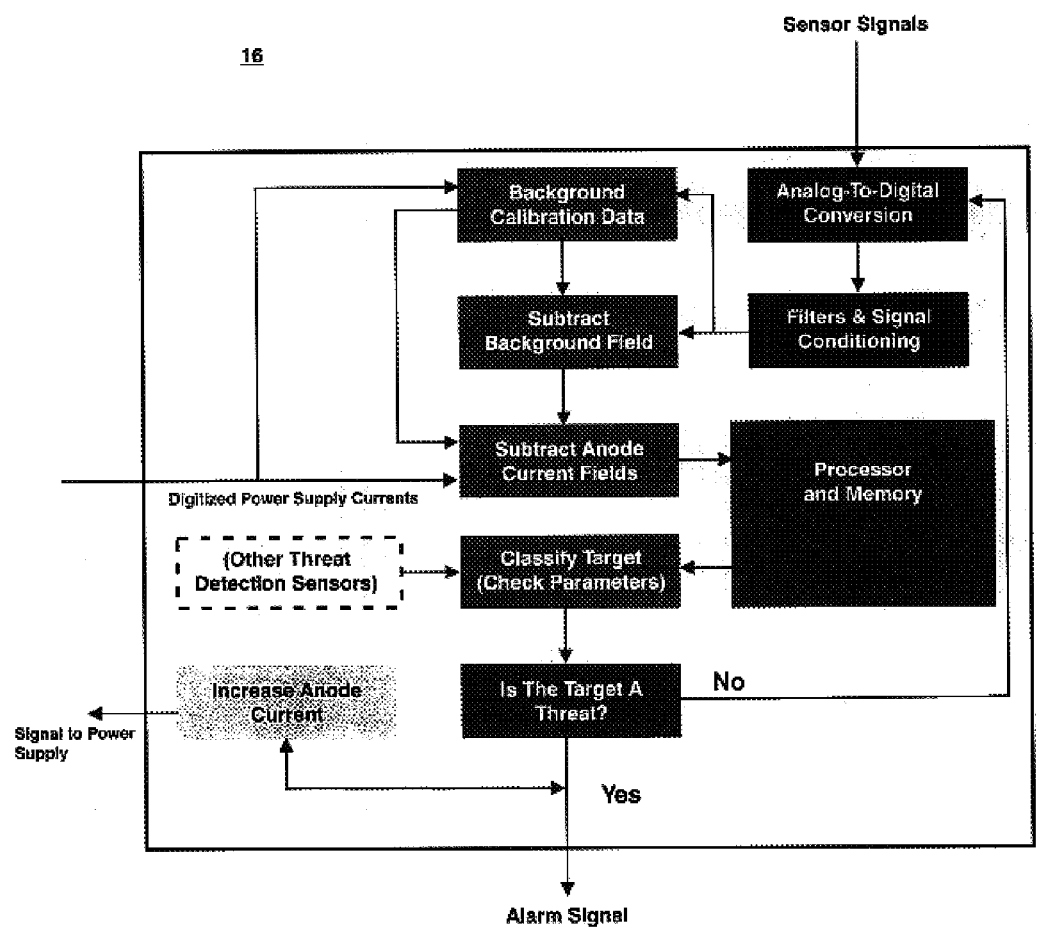
FIG. 3 is an example of a block diagram of the controller of the detection and deterrent system of the present invention

As illustrated by the block diagram of the controller 16 functions and components in FIG. 3, the controller 16 filters and converts the analog signals from the sensors 12 to digital and adjusts the current supplied by the power supply 14 to the anodes 10 in response to a target threat determination and communicates with the alarm display 18. The lethal current shock option and the mode selection signals could be sent to the controller 16 from an operator console (not shown).

In detection mode, the electric current supplied by the anodes 10 that is flowing in the seawater produces a voltage measured by the reference cells 12 located on the ship's hull 20. When the detection and deterrent system is first turned on, and allowed to stabilize, the detection system calibrates itself recording the voltages measured by all the reference cells 12. This data is then averaged and stored in the controller memory. After calibration, and when the system is in its active detection mode, any changes in the reference cell 12 voltages from that recorded during calibration would indicate the presence of an object in the vicinity of the hull 20 that is changing or distorting the flow of current around the hull 20. If the intruding object disturbing the current flow were a metallic conductor of higher conductivity than the surrounding water, the current would tend to concentrate in the higher conducting object. If the conductivity of the intruding object were less than the seawater (such as might be obtained if the intruding object were a swimmer with or without a wet or dry suit), then current flow would bend around the object. In either case the disturbance in the current, and the resultant changes in voltages measured by the reference cells 12 when the intruding object is present, would appear to be caused by a dipolar source located at the intruding object's position. The polarity of the apparent electric dipole for an intruding object of conductivity higher than seawater would be opposite that observed for an object of conductivity lower than seawater. In either case the distorted current distribution produced by the intruding object could be represented mathematically by a dipolar source positioned in the water at the location of the intruder.

Mathematically representing the intruding object as an electric dipole will allow its location to be determined. The unknown electrical parameters of the equivalent dipole that reproduces the observed distorted current flow are the 3 coordinates of its location relative to a point on the ship, and the magnitude of its strength in three orthogonal directions (3 collocated source components). Since the observed voltages measured by the reference cells are non-linear with respect to the 3 coordinates specifying the location of the dipolar source, non-linear mathematical techniques are required to solve for the six source parameters. The vector sum of the three computed source strength parameters could be used to identify the type of intruder (mechanical, human, etc.) based on its magnitude, while the coordinates of the equivalent dipole source would give its location. There are many standard non-linear mathematical techniques that can be used to solve for the required source parameters, including the use of artificial neural networks. The location and magnitude of the dipolar source representing the intruder would then be transmitted to other subsystems and to the alarm display system 18. The controller 16 may be implemented either in hardware or in the preferred embodiment it may be a microprocessor-based controller with software executing the various functions of the controller 16 and generating the necessary control signals.

After detection of an underwater intruder, the controller 16 would generate alarm signals. These signals would initiate an audible as well as visual alarm signal on an alarm display system 18 located in a convenient place on the ship. The alarm display system 18 which would include a display and an operator console (not shown) would indicate the approximate location of the intruder beneath the ship as calculated by the controller 16 from the sensor 12 readings.

The controller 16 would signal the power supply 14 to pulse the distributed anodes 10 with increased AC current or switched DC current to impart painful shocks to the intruder. The intensity of the shocks would then naturally increase as the swimmer moves toward the hull 20 and would decrease as the swimmer moves away from the hull 20. If the intruder continued to move toward the hull despite the shocks, an operator can arm the system manually to provide a lethal shock current into the water. For example, after manual selection and triggering, the power supply would increase the output to the anodes 10 to approximately 5000A at 60 Hz. A human heart is more likely to experience lethal arrhythmia when subjected to currents at 60 Hz. Alternatively, explosive charges dropped over the side of the ship at the indicated intrusion location could also be employed as additional deterrent or as a lethal solution. The controller 16 would signal the power supply 14 to resume normal monitoring operation when the current flow resumes a steady state condition indicating that the underwater threat has either moved out of range or has left.

In another embodiment, the sensors or reference cells 12 may be wired into zone patterns to aid in identification and location of the disturbance. For example, zone 1 would be the first twenty feet from the bow towards the stern, zone 2 would be the next twenty feet and so on. Furthermore, within each zone the sensors 12 could be multiplexed (not shown) so that each individual sensor 12 could be monitored for change. The individual sensor 12 with the greatest amplitude change would be nearest the intruder.

Figure 4:
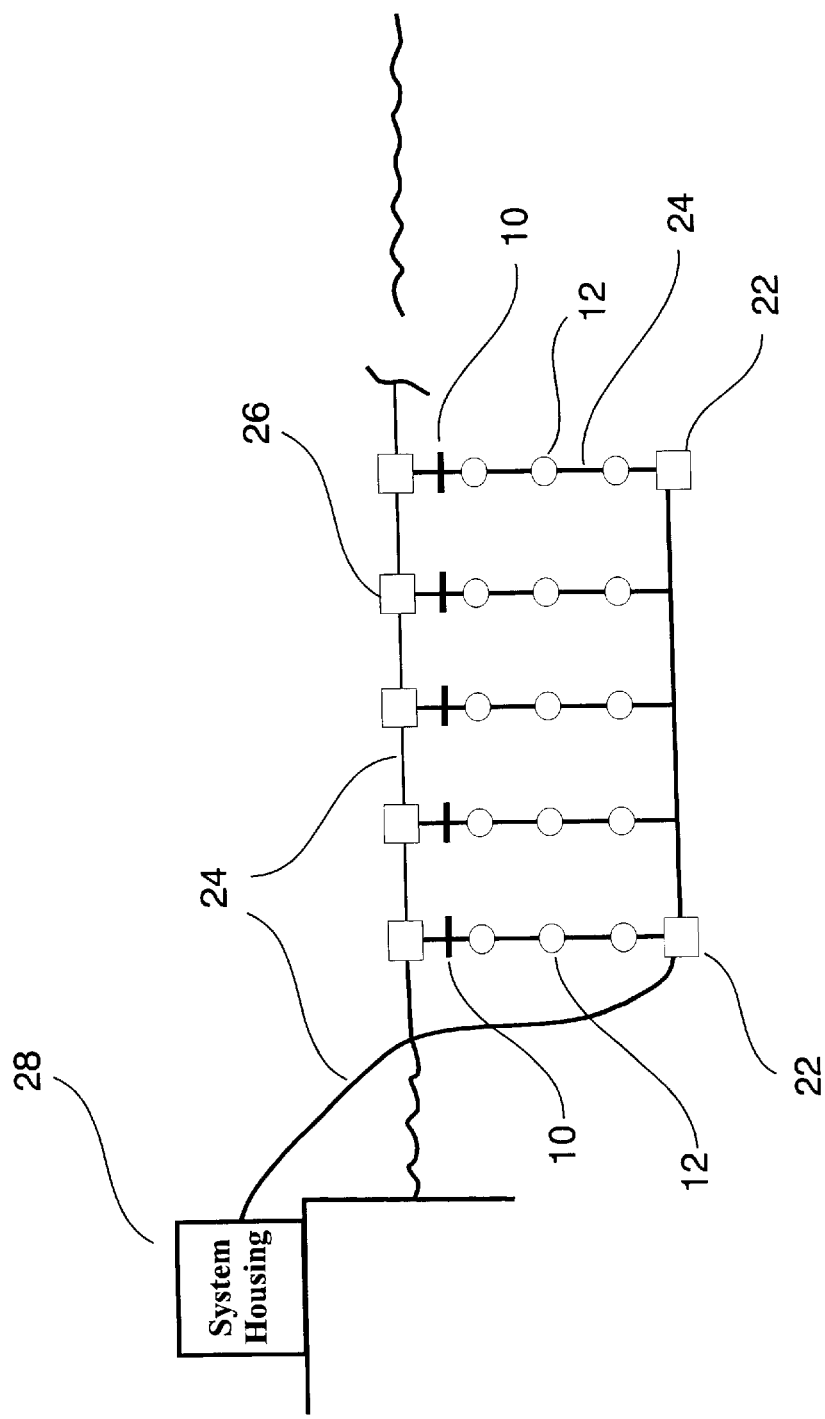
FIG. 4 is perspective view of another example of the detection and deterrent system deployed in a fishing line type arrangement.

In the examples of FIG. 4, the underwater detection and deterrent system is deployed on a net. This system would be capable of being laid around a ship or possibly across the mouth of a harbor. In this example, the power supply 14, controller 16 and alarm display system 18 would preferably be located on the shore in a single housing 28. Anodes 10 and sensors 12 are spaced apart in a net or in a fishing line type arrangement. The power supplied to the anodes 10 would return to the power supply 14 via a series of electrode returns 22 that would be dispersed on the bottom of the net or lines. These electrode returns 22 also serve as weights to orient the net or lines properly. Cables 24 provide electrical connectivity as well as structural support for the anodes 10, sensors 12 and electrode returns 22. The cabling for the net may be either a bundled cable with conducting elements and structural elements or it may be constructed as separate conducting cables and structural support cables. The cables 24 could also include horizontal members for structural support to arrange the system like a net. The net or lines are suspended in the water by a series of floats 26.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

What is claimed is:

1. An underwater detection and deterrent system comprising:
   a plurality of anodes for distributing current in an electrolyte;
   a plurality of sensors for sensing current flow in said electrolyte;
   a power supply for supplying electrical power to said anodes;
   a controller that receives current signals from said sensors,
      generates control signals for setting the level of current supplied by said power supply to said anodes in response to said current signals,
      and for generating alarm signals in response to said current signals; and
   an alarm display system responsive to said alarm.

2. An underwater detection and deterrent system as in claim 1, wherein said anodes are located on the hull of a ship.

3. An underwater detection and deterrent system as in claim 2, wherein said sensors are located on the hull of a ship.

4. An underwater detection and deterrent system as in claim 3, wherein said controller is a microprocessor.

5. An underwater detection and deterrent system as in claim 4, further comprising means for manually selecting the current level supplied to said anodes.

6. An underwater detection and deterrent system as in claim 5, wherein said alarm display includes both audible and visual indicators for indicating intrusion and location of the intrusion.

7. An underwater detection and deterrent system as in claim 1, wherein said anodes are located on a net suspended in the water.

8. An underwater detection and deterrent system as in claim 7, wherein said sensors are located on a net suspended in the water.

9. An underwater detection and deterrent system as in claim 8, wherein said controller is a microprocessor.

10. An underwater detection and deterrent system as in claim 9, further comprising means for manually selecting the current level supplied to said anodes.

11. An underwater detection and deterrent system as in claim 10, wherein said alarm display includes both audible and visual indicators for indicating intrusion and location of the intrusion.

12. An underwater detection and deterrent system comprising:
    a plurality of anodes distributed on the hull of a ship for imparting a current into an electrolyte;
    a plurality of sensors distributed on the hull of said ship for sensing said current flow in said electrolyte;
    a power supply for supplying electrical power to said anodes;
    a controller for receiving and processing current signals from said sensors, said controller outputting a level signal for setting the power supplied by said power supply, said controller outputting alarm signals; and
    an alarm display system responsive to said alarm signals.

13. An underwater detection and deterrent system as in claim 12, wherein said controller is a microprocessor.

14. An underwater detection and deterrent system as in claim 13, further comprising means for manually selecting the current level supplied to said anodes.

15. An underwater detection and deterrent system as in claim 14, wherein said alarm display includes both audible and visual indicators for indicating intrusion and location of the intrusion.

16. A method for detecting and deterring underwater threats comprising:
    supplying power to anodes whereby current flows between said anodes at a predetermined level;
    monitoring said current flow;
    providing an alarm if said current flow changes;
    increasing the current flow between said anodes in response to said alarm.

17. A method for detecting and deterring underwater threats as in claim 16, including indicating the location of said current flow change.

18. A method for detecting and deterring underwater threats as in claim 17, including resetting said current flow to said predetermined level in response to monitoring that indicates steady state current flows.

19. A method for detecting and deterring underwater threats as in claim 17, wherein said anodes are located on the hull of a ship.

20. A method for detecting and deterring underwater threats as in claim 19, further including the step of receiving a signal from a user to increase said current flow to lethal levels, and increasing the current flow between said anodes to a lethal level in response to said signal from a user.

* * * * *